(12) United States Patent
Luo (10) Patent No.: US 11,770,699 B2
(45) Date of Patent: Sep. 26, 2023

(54) MEDIA ACCESS CONTROL (MAC) ADDRESS PRIVACY HANDLING

(71) Applicant: Cypress Semiconductor Corporation, San Jose, CA (US)

(72) Inventor: Hui Luo, Marlboro, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 30 days.

(21) Appl. No.: 17/529,874

(22) Filed: Nov. 18, 2021

(65) Prior Publication Data
US 2023/0156461 A1 May 18, 2023

(51) Int. Cl.
| | |
|---|---|
| *H04W 12/02* | (2009.01) |
| *H04W 76/10* | (2018.01) |
| *H04W 12/03* | (2021.01) |
| *H04W 12/106* | (2021.01) |
| *H04W 12/0431* | (2021.01) |
| *H04L 29/12* | (2006.01) |
| *H04L 12/851* | (2013.01) |
| *H04L 29/06* | (2006.01) |
| *H04L 47/24* | (2022.01) |
| *H04L 9/40* | (2022.01) |
| *H04L 61/50* | (2022.01) |
| *H04L 101/622* | (2022.01) |

(52) U.S. Cl.
CPC ............. *H04W 12/02* (2013.01); *H04L 47/24* (2013.01); *H04L 61/50* (2022.05); *H04L 63/205* (2013.01); *H04W 12/03* (2021.01); *H04W 12/0431* (2021.01); *H04W 12/106* (2021.01); *H04W 76/10* (2018.02); *H04L 2101/622* (2022.05)

(58) Field of Classification Search
CPC . H04W 12/02; H04W 12/03; H04W 12/0431; H04W 12/106; H04W 76/10; H04L 47/24; H04L 61/50; H04L 63/205; H04L 2101/622; H04L 29/12; H04L 12/851; H04L 29/06
See application file for complete search history.

(56) References Cited

U.S. PATENT DOCUMENTS

| | | | |
|---|---|---|---|
| 2011/0078443 A1* | 3/2011 | Greenstein | H04L 63/061 713/169 |
| 2021/0036988 A1* | 2/2021 | McKibben | H04W 12/122 |
| 2021/0282007 A1* | 9/2021 | Ho | H04W 12/041 |
| 2022/0166774 A1* | 5/2022 | Lee | H04L 63/162 |

* cited by examiner

*Primary Examiner* — Quazi Farooqui (57) ABSTRACT

Implementations disclosed describe techniques to allow wireless devices to initially connect with randomized MAC addresses and send an encrypted permanent MAC for differentiated services. In one method, a first wireless device connects to an access point (AP) using a randomized MAC address. The first wireless device receives a request for a permanent MAC address from the AP. The first wireless device determines whether to send the permanent MAC address. Responsive to determining to send the permanent MAC address, the first wireless device encrypts the permanent MAC address to obtain an encrypted MAC address and sends a response to the request, including the encrypted MAC address, to the AP.

18 Claims, 7 Drawing Sheets

MEDIA ACCESS CONTROL (MAC) ADDRESS PRIVACY HANDLING

TECHNICAL FIELD

The disclosure pertains to wireless networks, more specifically, MAC privacy handling.

BACKGROUND

Many wireless local area network (WLAN) applications need to handle users differently based on the MAC addresses of the wireless devices. Existing solutions in enterprise environments use a permanent identifier, such as an International Mobile Equipment Identity (IMEI) on a subscriber identity module (SIM), to identify wireless devices. When a station (STA) device connects to an access point (AP) device using an extended access point (EAP) protocol, the STA device sends the permanent identifier to an EAP authentication server via the AP after encrypting the permanent identifier using the EAP server's public key. Other nearby STA devices cannot identify the STA device because the identifier is encrypted, and a random MAC address can be used. However, many home networks cannot handle the maintenance burden and complexity of a public key. So, the MAC address is used as an identifier (ID) for the wireless device. The MAC address is a convenient identifier in these applications.

To provide privacy, some devices can use randomized MAC addresses since the MAC addresses are not encrypted. In enterprise environments, the AP can still identify using the encrypted identifier, but other nearby STAs cannot identify the STA device since it is using a randomized MAC address. In public hotspot WLAN systems with access control, such as a hotel wireless network, a web-based authentication can be used to identify and authenticate a wireless device. In this case, the user sends a user ID to the authentication server over a Hypertext transfer protocol secure (HTTPS) protocol. However, there is no good solution for randomized MAC addresses in home wireless networks and automotive wireless networks. For example, parental controls based on MAC addresses can be bypassed by enabling MAC address randomization.

DETAILED DESCRIPTION

Modern wireless network environments often have to provide wireless connectivity to a large number of client devices using wireless local area networks (WLANs), such as the WiFi® networks, in one implementation. In one illustrative example, a wireless network may be located in an automotive environment where the base station is integrated into an automobile (a passenger car, a sport-utility vehicle, a truck, a passenger bus) and where client devices may include laptops, tablets, smartphones, headrest screens, and the like. Several automobile occupants may use the same automotive wireless network, each occupant possibly using multiple client devices. Some of the client devices may access the internet for infotainment and impose significant demands on the bandwidth of the wireless connection, e.g., during video downloads, or live streaming.

Various client devices may use different protocols for wireless connection at a number of radio frequencies. For example, IEEE 802.11b and 801.11g devices are capable of connecting at 2.4 GHz band, whereas 802.11n, 802.11ac, and 802.11ax devices may be capable of using both 2.4 GHz and 5 GHz bands. Even though wireless environments typically use one or both of these two bands, some protocols may use other frequencies. For example, 802.11ad protocol uses the 60 GHz band, which can support—within a distance of about 10 feet—a larger bandwidth and a bitstream rate than is higher than bitstreams of either 2.4 GHz or 5 GHz bands.

As described above, some client devices can use randomization of MAC addresses for privacy. When using randomized MAC addresses, some home networks and automotive wireless networks can have conflicts when applications need to treat users differently based on MAC addresses (referred to herein as differentiated services).

Aspects of the present disclosure overcome these deficiencies and others by allowing wireless devices to initially connect with randomized MAC addresses and send an encrypted permanent MAC for differentiated services. In general, an AP requests an STA's permanent MAC address for differentiated services in a beacon, a probe response, or a message of a handshake protocol, as described in more detail below. The STA connects to an AP using a randomized MAC address for privacy. The STA can decide whether to send its permanent MAC address to the AP in encrypted form based on a policy, and the STA sends the permanent MAC address in encrypted form responsive to a decision. For example, an AP can identify a car owner's wireless devices using this enhancement in an automotive wireless network while allowing the car owner's wireless devices running MAC address randomization for privacy. Once the car owner's wireless device is identified, preferred Quality of Service (QoS) treatment can be applied to the car owner's wireless devices.

For another example, an AP can send a request for a permanent MAC (e.g., "MAC Ind Required") to require STAs to send back their permanent MAC address in a home wireless network, so that MAC address-based parental control can be enforced and cannot be bypassed by enabling MAC address randomization.

In one method of a wireless device, the wireless device connects to an AP using a first MAC address, where the first MAC address is a randomized MAC address. The wireless device receives, from the AP, a request for a permanent MAC address. The wireless device can determine whether to send the permanent MAC address based on a device policy. The wireless device encrypts the permanent MAC address to obtain an encrypted MAC responsive to a determination to send the permanent MAC address. The wireless device sends a response to the request with the encrypted MAC address to the AP. The wireless device can maintain compatibility with other devices that do not support the enhanced functionality described herein. The embodiments described herein can be used in environments other than home and automotive wireless networks.

Figure 1:
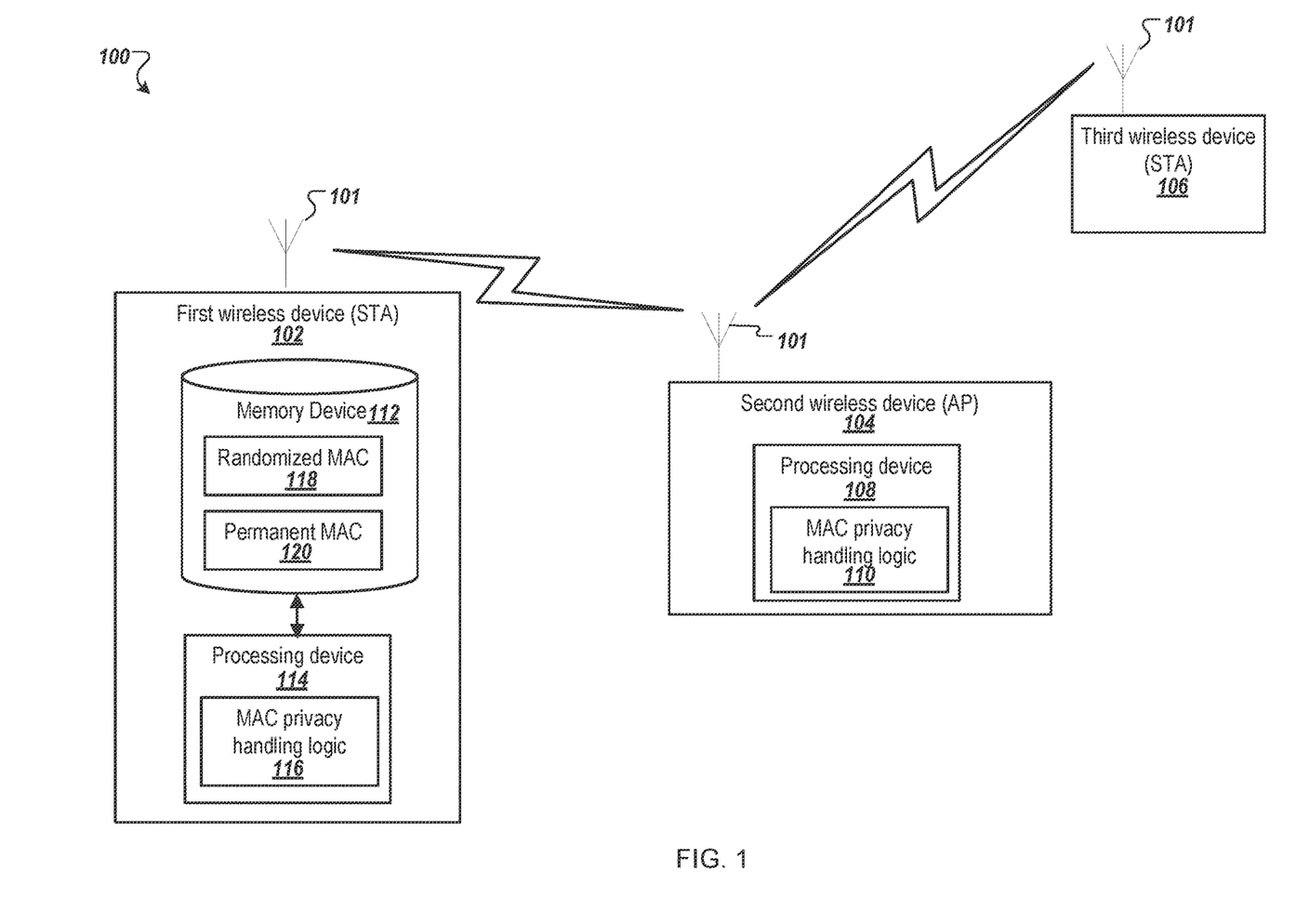
FIG. 1 is a network diagram of a wireless network of wireless devices with MAC privacy handling logic according to at least one embodiment.

FIG. 1 is a network diagram of a wireless network 100 of wireless devices with MAC privacy handling logic according to at least one embodiment. The wireless network 100, such as WLAN, in one implementation, may have a first wireless device 102, a second wireless device 104, and a third wireless device 106, each equipped with one or more antennas 101 supporting receiving and transmitting signals within one or more frequency ranges (which may include the 2.4 GHz band, the 5 GHz band, the 60 GHz band, or the like). The antennas 101 can be single antennas, multiple-input, and multiple-output (MIMO) antennas, multiple antennas, or the like. In one implementation, the first wireless device 102 is programmed to operate as a wireless station (STA) device, and the second wireless device 104 is programmed to operate as an access point (AP) device. The second wireless device 104 provides an AP to the STA devices, including the first wireless device 102 and the third wireless device 106. The second wireless device 104 includes a processing device 108, which includes MAC privacy handling logic 110. In at least one embodiment, the MAC privacy handling logic 110 comprises hardware (e.g., circuitry, dedicated logic, programmable logic, microcode, etc.), software (such as operations being performed by the processing device 114), firmware, or a combination thereof. The first wireless device 102 includes a memory device 112 and a processing device 114 coupled to the memory device 112. The processing device 114 includes MAC privacy handling logic 116. In at least one embodiment, the MAC privacy handling logic 116 comprises hardware (e.g., circuitry, dedicated logic, programmable logic, microcode, etc.), software (such as operations being performed by the processing device 114), firmware, or a combination thereof. It should be noted that although the third wireless device 106 does not include any MAC privacy handling logic 116, the second wireless device 104 maintains compatibility with the third wireless device 106, as described in more detail below. The MAC privacy handling logic 110 and the MAC privacy handling logic 116 allow the first wireless device 102 to use a randomized MAC address 118 for privacy purposes, while allowing applications on the second wireless device 104 to provide differentiated services based on the permanent MAC address 120.

In at least one embodiment, the memory device 112 stores a randomized MAC address 118 and the permanent MAC address 120. The MAC privacy handling logic 116 can generate the randomized MAC address 118 using one or more randomization techniques when connecting to APs. The randomized MAC address 118 can provide privacy from other wireless devices while keeping the permanent MAC address private. The MAC privacy handling logic 116 and the MAC privacy handling logic 110 can be used to request and provide the permanent MAC address 120 when needed to identify the first wireless device 102 for differentiated services. Additional details of MAC privacy handling are described below with respect to FIGS. 2-3.

During operation, in at least one embodiment, the first wireless device 102 connects to an AP provided by the second wireless device 104 using a first MAC address. The first MAC address is the randomized MAC address 118. Since the randomized MAC address 118 cannot be used to identify the first wireless device 102 for differentiated services, the second wireless device 104 sends a request for the permanent MAC address 120. From the AP, the first wireless device 102 receives the request for the permanent MAC address 120 and determines whether to send the permanent MAC address 120. The first wireless device 102 can use a policy to determine whether to send the permanent MAC address 120 to this particular AP. Responsive to a determination to send the permanent MAC address 120, the first wireless device 102 encrypts the permanent MAC address 120 to obtain an encrypted MAC address. The first wireless device 102 sends to the AP a response to the request with the encrypted MAC address.

In at least one embodiment during operation, the third wireless device 106 connects to an AP provided by the second wireless device 104 using a second MAC address. The second MAC address can be a permanent MAC address or a randomized MAC address. If the third wireless device 106 connects using a randomized MAC address, the second wireless device 104 sends a request for a permanent MAC address. Since the third wireless device 106 does not include MAC privacy handling logic, the third wireless device 106 receives the request but does not recognize the request. The third wireless device 106 ignores the request. The second wireless device 104 does not receive a permanent MAC address from the third wireless device 106 and does not provide differentiated services to the third wireless device 106. Similarly, if the first wireless device 102 connects to an AP that does not include the MAC privacy handling logic 110, the AP does not request the permanent MAC address 120 from the first wireless device 102.

The wireless network 100 may support multiple client devices. For example, some client devices may establish WLAN associations with the second wireless device 104. Additionally, some client devices may establish personal area network (PAN) associations with the second wireless device 104 and/or with other devices.

In at least one embodiment, the wireless network 100 may be implemented in an automotive environment, a home environment, or any other environment that may benefit from the MAC privacy handling. Such environments may include wireless networks in passenger houses, apartments, dwellings, airplanes, trains, ships, or other transportation environments. The wireless network 100 may also be implemented outside transportation environments, for example, in hotels, at conferences, and so on.

In one implementation, the frequency range may correspond to the range of frequencies commonly referred to as the 2.4 GHz regulatory domain, such as the range from 2,400 to 2,485 MHz, or any sub-range within this frequency range. In one implementation, the frequency range may correspond to the range of frequencies commonly referred to as the 5 GHz regulatory domain, such as the US range from 5,180 to 5,874 MHz, or any sub-range within this frequency range. In some implementations, a broader range of frequencies may be used. For example, European regulations may allow frequencies down to 5,160 MHz. Other frequency ranges may be used in other implementations, such as a range including the 60 GHz range or any other range used for wireless networking. In some implementations, the frequency range may be broad enough to contain multiple regulatory bands. For example, a first frequency range in one implementation may include both the 2.4 GHz and 5 GHz bands, whereas a second frequency range may contain the 60 GHz band. For such implementations, the notation 2.4 GHz should be understood as a shorthand for the first frequency range, namely any range where overcrowding is to be avoided. Similarly, the notation 5 GHz should be understood as a shorthand for the second frequency range, namely any range into which the connecting devices are to be steered. In some implementations, the 5 GHz band may be within the first frequency range, whereas 2.4 GHz may be within the second frequency range.

Figure 2:
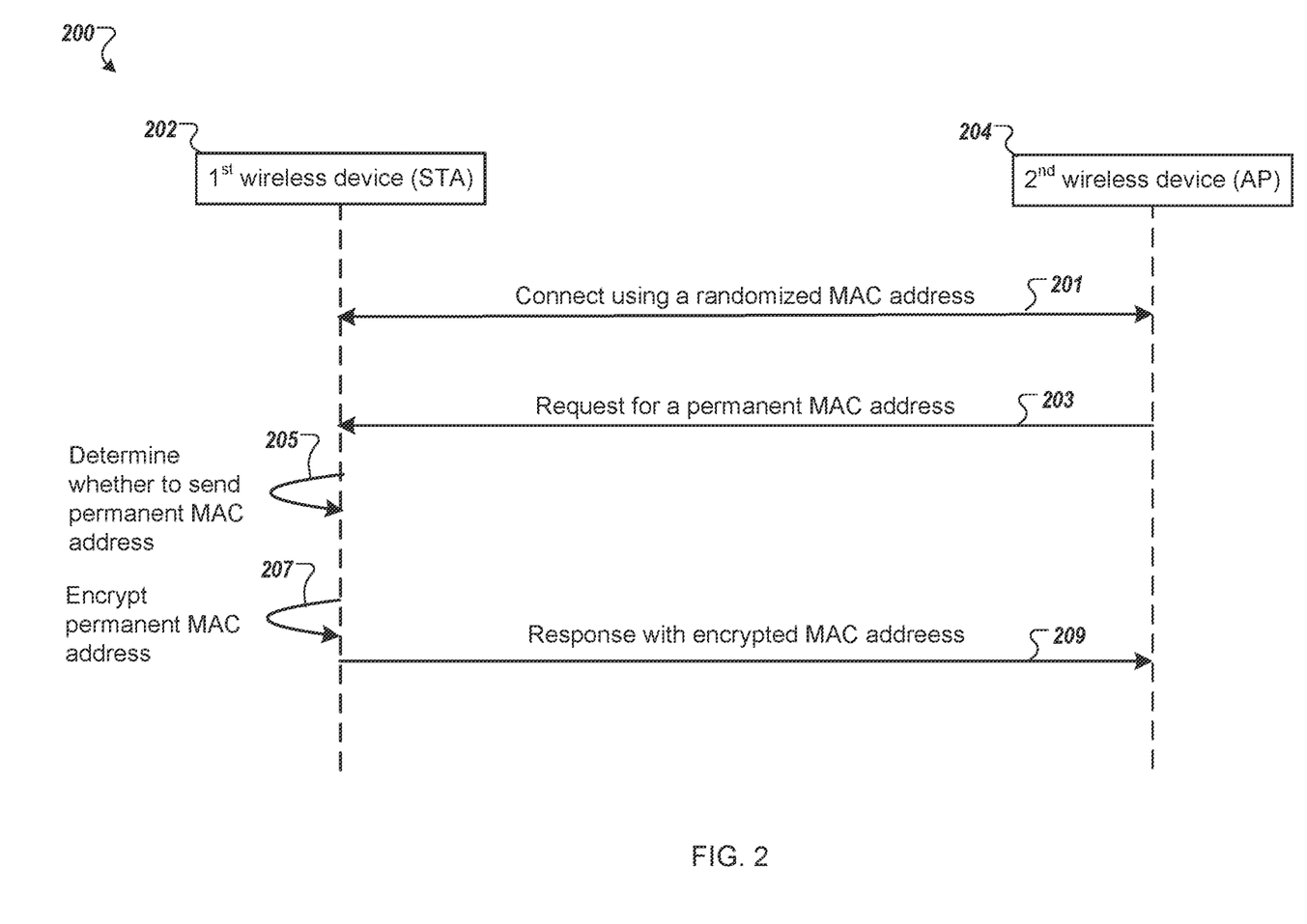
FIG. 2 is a sequence diagram of a process flow of a first wireless device and a second wireless device for requesting and providing an encrypted MAC address according to at least one embodiment.

FIG. 2 is a sequence diagram of a process flow 200 of a first wireless device 202 and a second wireless device 204 for requesting and providing an encrypted MAC address according to at least one embodiment. The process flow 200 begins with the first wireless device 202 and the second wireless device 204 establishing a connection 201 using a randomized MAC address for the first wireless device 202. The first wireless device 202 can receive a request 203 for a permanent MAC address. The request 203 can be made in connection with establishing the connection 201. For example, the second wireless device 204 can send a beacon frame with the request 203. Alternatively, the second wireless device 204 can send a probe response with the request 203, in response to a probe request sent by the first wireless device 202. In another embodiment, the second wireless device 204 can send the request 203 in a separate message, such as part of a handshake between the first wireless device 202 and the second wireless device 204. The first wireless device 202 determines whether to send a permanent MAC address to the second wireless device 204 (operation 205). If the first wireless device 202 determines not to send the permanent MAC address at operation 205, the request 203 is ignored, and the process flow 200 ends. However, if the first wireless device 202 determines to send the permanent MAC address at operation 205, the first wireless device 202 encrypts the permanent MAC address to obtain an encrypted MAC address (operation 207) and send a response 209 with the encrypted MAC address, and the process flow 200 ends.

In at least one embodiment, the first wireless device 202 encrypts the permanent MAC address at operation 207 using an encrypted temporal key (e.g., a session key) provided by the second wireless device 204. In another embodiment, the first wireless device 202 encrypts the permanent MAC address at operation 207 using a key known to the second wireless device 204. The second wireless device 204 can receive the encrypted MAC address at operation 209 and decrypt it to obtain the permanent MAC address of the first wireless device 202. The permanent MAC address can be used by the second wireless device 204 to provide differentiated services, such as QoS prioritization, parental control, or the like.

Figure 3:
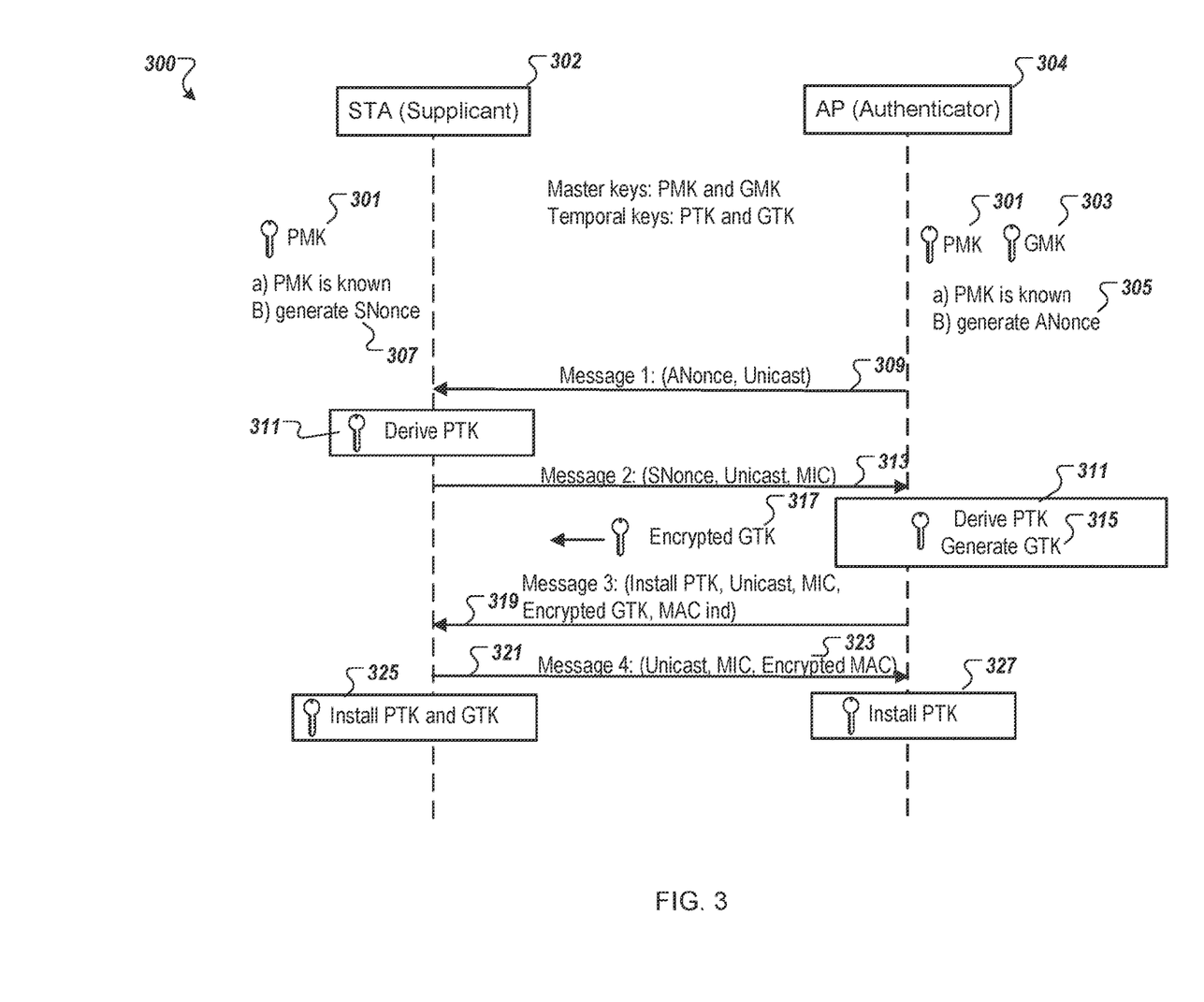
FIG. 3 is a sequence diagram of a process flow of an STA and an AP performing a four-way handshake for requesting and providing an encrypted MAC address according to at least one embodiment.

FIG. 3 is a sequence diagram of a process flow 300 of an STA 302 and an AP 304 performing a four-way handshake for requesting and providing an encrypted MAC address according to at least one embodiment. In the process flow 300, the STA 302 connects to the AP 304 using a first MAC address, where the first MAC address is a randomized MAC address. The STA 302 can connect to the AP 304 using the random MAC address for privacy. It can later decide whether to send its permanent MAC address to the AP 304 in an encrypted form based on a policy. The AP 304 uses two master keys, including a pairwise master key (PMK) 301 and a group master key (GMK) 303. The PMK 301 is known to the STA 302 (e.g., a shared key), but GMK 303 is not known to the STA 302. In at least one embodiment, the GMK 303 is a secret key held by AP and will be used to generate a group temporal key (GTK). The AP 304 generates a first nonce 305 (ANonce), whereas the STA 302 generates a second nonce 307 (SNonce). The AP 304 can send a first message 309 to the STA 302. The first message 309 can include the first nonce 305. The STA 304 derives a pairwise temporal key (PTK) 311 using the PMK, the first nonce 305, the second nonce 307, the first MAC address (randomized MAC address) of the STA 302, and a second MAC address of the AP 304. In at least one embodiment, three portions of the PTK 311 can be used for different purposes: a key confirmation key (KCK), a key encryption key (KEK), and a temporal key (TK). The STA 302 can send a second message 313 that includes at least the second nonce 307. The second message 313 can also include a first integrity code (MIC). The first MIC can be used to prevent an attacker from tampering with the second message (the second nonce 307). That is, the AP 304 can use the first MIC to ensure that the second message 313 was not altered. The AP 304 derives the PTK 311 using the PMK, the first nonce 305, the second nonce 307, the first MAC address (randomized MAC address) of the STA 302, and a second MAC address of the AP 304 and generates a group temporal key (GTK) 315. In at least one embodiment, the GTK 315 is encrypted by the AP 304 using the KEK from the PTK 311 so that an encrypted GTK 317 can be shared with the STA 302. The encrypted GTK 317 can be an encrypted session key for broadcast/multicast data between the AP 304 and the STA 302. The AP 304 can send a third message 319 to the STA 302. The third message 319 can include the encrypted GTK 317 and a request for a permanent MAC address. The request for the permanent MAC address can be an indication (e.g., labeled "MAC Ind") that the permanent MAC address is requested or an indication that the permanent MAC address is required by the AP 304. The AP 304 can indicate that it is requesting the STA's permanent MAC address for differentiated services. In this embodiment, the indication is sent in an element of the third message 319. As described herein, the indication can be sent in a beacon frame, a probe response, or other messages. The request can be an element formatted in a key data encapsulation (KDE) format. Additional details of the KDE elements are described below with respect to FIG. 4. The third message 319 can also include a second MIC. The second MIC can be used to prevent an attacker from tampering with the message. That is, the STA 302 can use the second MIC to ensure that the third message 319 was not altered.

After receiving the encrypted GTK 317 in the third message 319, the STA 302 can decrypt the encrypted GTK 317 to obtain the GTK 315. The STA 302 can encrypt a permanent MAC address using the TK to obtain an encrypted MAC address 323. The STA 302 can send a fourth message 321 to the AP 304. The fourth message 321 can include the encrypted MAC address 323. The encrypted MAC address 32 can be an element formatted in the KDE format. Additional details of the KDE elements are described below with respect to FIG. 4. The fourth message 321 can also include a third MIC. The third MIC can be used to prevent an attacker from tampering with the message. That is, the AP 304 can use the third MIC to ensure that the fourth message 321 was not altered. The STA 302 can install the PTK and the GTK (operation 325), and the AP 304 can install the PTK (operation 327), and the process flow 300 ends, and the rest of communication is encrypted by TK for unicast data and by GTK for broadcast/multicast data between the AP 304 and the STA 302.

In other embodiments, other information can be exchanged between the STA 302 and the AP 304, as long as the request for the permanent MAC address is sent by the AP 304 and the encrypted MAC address is sent back by the STA 302.

It should be noted that wireless devices that have this functionality can maintain compatibility with other wireless devices without this functionality. For example, if the AP 304 sends the third message 319 with the request for the permanent MAC address ("MAC Ind"), a receiving wireless device without this functionality can ignore the request and not send the fourth message 321 with the encrypted MAC address. That is, a regular STA that does not understand the indication (MAC Ind) that the permanent MAC address is requested or required (e.g., in KDE format) in the third message 319 can ignore the KDE and continue the four-way handshake protocol. A regular AP does not send the indication (MAC Ind) in the third message 319, so the STA 302 (e.g., an enhanced STA with this functionality) does not send back the encrypted MAC address (e.g., in KDE format) in the fourth message 321. Thus, the STA 302 with this functionality (e.g., enhanced STA) can work with the AP 304 with this functionality (e.g., an enhanced AP) or a standard AP, and the AP 304 (e.g., enhanced AP) can work with the STA 302 (e.g., enhanced STA) or a standard STA. In at least one embodiment, the STA 302 and the AP 304 are part of an automotive wireless network. In at least one embodiment, the STA 302 and the AP 304 are part of a home wireless network.

Figure 4:
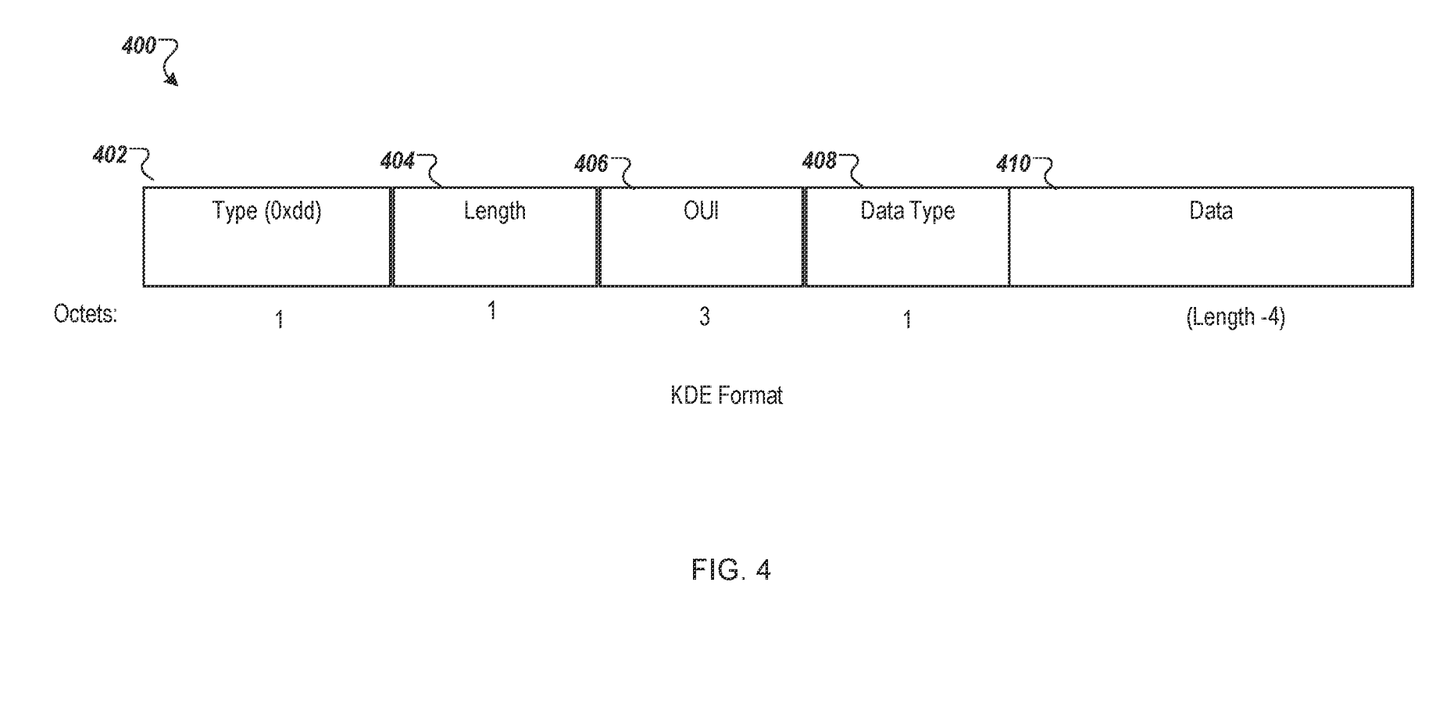
FIG. 4 illustrates an example key data encapsulation (KDE) element of a message used in a four-way handshake for requesting and providing an encrypted MAC address according to at least one embodiment.

FIG. 4 illustrates an example key data encapsulation (KDE) element 400 of a message used in a four-way handshake for requesting and providing an encrypted MAC address according to at least one embodiment. The KDE element 400 includes a type field 402, a length field 404, an organizationally unique identifier (OUI) field 406, a data type field 408, and a data field 410. The type field 402 can include a single-octet value that specifies a type of element. The length field 404 can be a single-octet value that specifies the length of the KDE element 400. The OUI field 406 can include a three-octet value that identifies a specific vendor (or includes vendor-specific information). The data type field 408 can be a single-octet value that specifies the indication (e.g., MAC Ind Requested/Required) or that the data field 410 contains the encrypted MAC address. The data field 410 can be a multi-octet value representing the data (e.g., encrypted MAC address). In at least one embodiment, the KDE element 400 includes an indication that the AP 304 is requesting or requiring a permanent MAC address in the data type field 408. In at least one embodiment, the KDE element 400 includes the encrypted MAC address in the data field 410. In other embodiments, the request or indication can be in other fields of the KDE element 400. In other embodiments, the encrypted MAC address can be included in a payload of the message.

Figure 5:
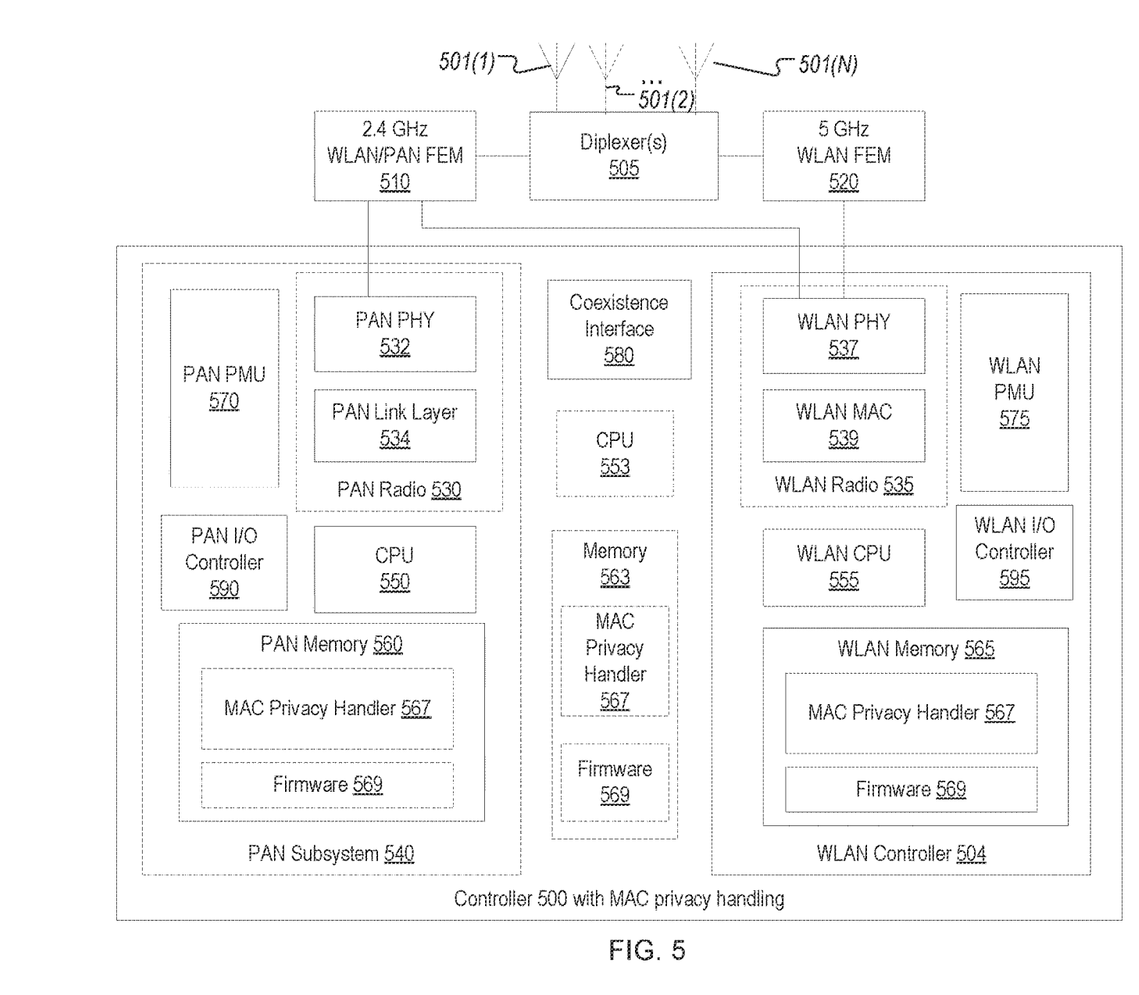
FIG. 5 is a block diagram of one exemplary implementation of a controller capable of implementing MAC privacy handling, according to at least one embodiment.

FIG. 5 is a block diagram of one exemplary implementation of a controller 500 capable of implementing MAC privacy handling, according to at least one embodiment. The controller 500 may be implemented as an integrated circuit (IC) device (e.g., disposed on a single semiconductor die). As illustrated in FIG. 5, the controller 500 provides dual-band access functionality, such as dual-AP, for the wireless network 100 of FIG. 1 and further enables the capability to allow STAs to use randomized MAC addresses while still requesting and providing permanent MAC addresses for differentiated services. An AP is defined as a set of hardware/software components with functionality for supporting wireless connectivity for a given frequency range, rather than a specific set of particular hardware and/or software components. The term "dual-AP" should be understood as referring to the functionality that enables more than one AP on the same controller; the number of APs may be two in some implementations, but may be more than two (e.g., three, four, and so on) in other implementations. The MAC privacy handling refers to the handling of randomized MAC addresses while still allowing permanent MAC addresses to be used for differentiated services.

The controller 500 with MAC privacy handling may support various types of wireless networks. In one implementation, the controller 500 with MAC privacy handling may include the WLAN (e.g., a Wi-Fi® local area network) controller 504 and the PAN (e.g., a Bluetooth® personal area network) subsystem 540. The WLAN may support two APs, for example, the first AP corresponding to the 2.4 GHz frequency range and the second AP corresponding to the 5 GHz frequency range, in one implementation. The PAN may operate within the same first frequency range, in one implementation. The controller 500 with MAC privacy handling may use (or be connected to) one or more antennas 501(1), 501(2), . . . 501(N), to receive and transmit radio waves within the frequency ranges used by the APs of the controller 500 with MAC privacy handling. The number of antennas 501 may be the same as the number of APs of the WLAN, in one implementation. In other implementations, the number of antennas 501 may be more than the number of APs. Some APs may use multiple antennas 501. In some implementations, the PAN subsystem 540 may use a designated antenna (or multiple antennas). In some implementation, the PAN subsystem 540 may use antennas 501 that are shared with the WLAN controller 504. In some implementations, a single multi-input multi-output (MIMO) antenna may be used.

The signal received by the antenna(s) 501 may be fed via a diplexer 505 to the front-end module (FEM) 510 for the first frequency range (e.g., serving both WLAN and PAN) and to the FEM 520 for the second frequency range (serving WLAN, in one implementation). In some implementations, a multiplexer may be used in place of the diplexer 505, for example, where more than two APs are supported by the controller 500 with MAC privacy handling. In some implementations, no diplexer or multiplexer may be used, and each antenna may have a separate FEM. The FEMs 510 and 520 may include filters (e.g., band-pass filters), low-noise radio-frequency amplifiers, down-conversion mixer(s), and other circuitry (analog and/or digital) that may be used to process modulated signals received by the antenna into signals suitable for input into the baseband analog-to-digital converters. Similarly, the FEM 510 and 520 may process analog signals output to the antennas 501 for transmission. The FEM 510 and 520 may be connected to a WLAN radio 535. The WLAN radio 535 may be a dual-band radio providing the WLAN controller 504 with the capability to concurrently process signals through two WLAN FEMs operating at two different frequency ranges. The WLAN radio 535 may include a physical layer component (WLAN PHY) 537, such as 802.11ac PHY, that may transform the received digital signal to frames (data packets) that can then be fed into a WLAN media access control layer (WLAN MAC) 539, such as 802.11ac MAC. The WLAN PHY 537 may include intermediate-frequency amplifiers, analog-to-digital converters, inverse Fourier transform modules, deparsing modules, interleavers, error correction modules, scramblers, PHY-MAC padding layers, and other components. In some implementations, all PHY components may be integrated into the same chip. In some implementations, the WLAN MAC 539 may be integrated with WLAN PHY 537 on the same chip. In other implementation, some components, e.g., the analog-to-digital converters and/or intermediate-frequency amplifiers, may be executed by separate circuitry of the WLAN radio 535 but outside the WLAN PHY 537. In some implementations, some of the WLAN PHY 537 components may be combined with the FEMs components.

In some implementations, WLAN MAC 539 may not be a part of the WLAN radio 535 but instead may be implemented on a WLAN central processing unit (WLAN CPU) 555 using a logical thread of the WLAN CPU 555. In other implementations, WLAN MAC 539 may be implemented as a component separate from both the WLAN CPU 555 and the WLAN radio 535. In one implementation, the interaction of the WLAN components may happen as follows. The WLAN CPU 555 executing a logical link control (LLC), in communication with a WLAN memory 565, may prepare a data packet, such as a MAC service data unit, and provide it to the WLAN MAC 539, which may add additional bytes (e.g., header bytes and/or tail bytes) to form an appropriate 802.11ac MAC protocol data unit before sending the protocol data unit to the WLAN PHY 537 for digital-to-analog processing, intermediate-frequency amplification, and filtering, in one implementation. The analog signal output by the WLAN PHY 537 may then be provided to the WLAN FEMs 510 and WLAN FEM 520 for radio frequency processing and transmission through one or more of the antennas 501. The reverse process may occur when an incoming radio-frequency signal is received through the antenna(s) 501.

The dual-AP functionality may be provided by some or all of the disclosed components. In one implementation, the disclosed components of the WLAN controller 504 may be implemented on a single Real Simultaneous Dual Band (RSDB) chip. In one implementation, the WLAN CPU 555 may allocate a first logical processor (or CPU core) to enable the first AP corresponding to the first frequency range (e.g., 2.4 GHz) and a second logical processor (or CPU core) to enable the second AP corresponding to the second frequency range (e.g., 5 GHz). In another implementation, a single logical processor (or CPU core) may execute multiple APs. The logical processors may execute LLCs for the corresponding APs, prepare MAC service data units for these APs, and provide the service data units to the WLAN MAC(s) 539 for processing into MAC protocol data units and transmitting the protocol data units through the WLAN PHY 537 and WLAN FEMs 510 and 520. A single WLAN MAC 539 may be processing and outputting MAC data for both APs, in one implementation. In another implementation, multiple WLAN MACs 539 may be processing and outputting MAC data, where a separate AP-assigned WLAN MAC 539 communicates with the AP-assigned logical processor of the WLAN CPU 555. In some implementations, WLAN MACs 539 may be implemented as software executed by the WLAN CPU 555, e.g., by the corresponding logical processors.

The double output of the WLAN MAC(s) 539—namely, the first AP MAC protocol data units and the second AP MAC protocol data units—may be fed to the WLAN PHY(s) 537 for separate digital-to-analog processing and transmission, as described above. A single WLAN PHY 537 may be capable of processing and transmitting multiple AP data units, in one implementation. For example, the WLAN PHY 537, using the same circuitry and components, may be processing and transmitting data units for the first AP during a first set of discrete-time intervals and for the second AP during a second set of discrete-time intervals, so that there may be no overlap between the first time intervals and the second time intervals. In another implementation, there may be multiple separate WLAN PHYs for different APs. For example, a first WLAN PHY 537 may have dedicated 2.4 GHz components for the first AP, such as intermediate-frequency amplifiers, analog-to-digital converters, interleavers, error correction modules, scramblers. Likewise, a second WLAN PHY 537 may have dedicated 5 GHz components for the second AP. The analog signals produced by double WLAN PHY 537 may then be output to separate WLAN FEMs 510 and 520, mixed by the diplexer 505, and transmitted through one or more of the antennas 501 concurrently. The received signals corresponding to two APs may be processed similarly in reverse order.

The disclosed implementations allow scalability to support more than two APs. For example, the number of the WLAN FEMs may equal the number of APs, the diplexer 505 may be replaced with a multiplexer, and the number of dedicated WLAN PHY layers 537 may be equal to the number of APs, in one implementation. A single WLAN MAC 559 may be used to process data units for multiple APs, or separate dedicated WLAN MAC layers 539 may be implemented, with a separate logical processor of the WLAN CPU 555 assigned to each WLAN MAC 539.

The MAC privacy handling may be enabled by a MAC privacy handler 567, in one implementation. The MAC privacy handler 567 may be a set of executable instructions loaded into WLAN memory 565 from the firmware 569 after boot. The MAC privacy handler 567 may be executed by the WLAN CPU 555. The MAC privacy handler 567 may cause the WLAN CPU 555 to execute the process illustrated and described herein.

The WLAN controller 504 may also include a WLAN power management unit (PMU) 575, which may manage clock/reset and power resources for the other components of the WLAN controller 504. The WLAN controller 504 may further contain a WLAN input/output (I/O) controller 595 to enable communications with external devices and structures. In some implementations, the WLAN I/O controller 595 may enable a general purpose I/O (GPIO) interface, a USB I²C module, an I²S and/or a PCM digital audio module, and other I/O components.

The controller 500 with MAC privacy handling may support multiple networks on the same platform, such as with the RSDB chip in one implementation. For example, in addition to the WLAN controller 504 enabling the WLAN, the controller 500 with MAC privacy handling may also include a PAN subsystem 540. The PAN subsystem 540 may enable the PAN, which may share one or more frequency ranges with the WLAN, for example, the PAN may be operating in the first frequency range. The PAN may share the FEM 510 and one or more antennas 501 with the WLAN in some implementations. In some implementations, the PAN subsystem 540 may have a dedicated PAN FEM. The shared WLAN/PAN FEM 510 may be providing/receiving signals to/from a PAN radio 530. The PAN radio 530 may be a single-band radio and include a PAN PHY layer 532 having components similar to the WLAN PHY layer 537. In some implementations, the PAN PHY 532 may have some components that the WLAN PHY 537 may lack or, vice versa, the PAN PHY 532 may have some additional components. In some implementations, the PAN PHY 532 may share some components with the WLAN PHY 537. The PAN PHY 532 may communicate with a PAN Link Layer 534, which may be a component of the PAN radio 530, in some implementations, or may be realized as a software component executed by the PAN CPU 550. The PAN Link Layer 534 may have a number of states, such as advertising, scanning, initiating, connection, standby. The PAN subsystem 540 may have a PAN memory 560, a PAN PMU 570, and a PAN I/O controller 590, which may perform functions similar to the functions performed by their WLAN counterparts.

The controller 500 may include a coexistence interface 580 to facilitate the coexistence of the WLAN controller 504 and the PAN subsystem 540. Because the WLAN and the PAN may operate within the same frequency range and on the same device (e.g., chip), the coexistence interface 580 may help resolve potential performance and reliability issues of both networks. For example, the coexistence interface 580 may mitigate interference between the networks through temporal, spatial, and frequency isolation, channel selection, and the like.

The WLAN memory 565 (and, similarly, the PAN memory 560) may include read-only memory (ROM) and/or random-access memory (RAM). In some implementations, memory may be shared between the WLAN controller 504 and the PAN subsystem 540, as shown by memory 563. In some implementations, the MAC privacy handler 567 may be implemented in the PAN memory 560, as indicated by the corresponding dashed rectangle, or in the shared memory 563. Similarly, the firmware 569 may be stored in the PAN memory 560 and/or in the shared memory 563. In some implementations, the controller 500 with MAC privacy handling may have only one processor, such as the WLAN CPU 555, which serves the WLAN and the PAN. In other implementations, only the PAN subsystem 540 may have a processor such as the CPU 550, which serves both the WLAN and the PAN, whereas the WLAN controller 504 does not have a separate CPU. In one implementation, a shared CPU, such as a CPU 553, may be used, whereas neither the WLAN controller 504 nor the PAN subsystem 540 has a separate processor. Although the controller 500 is illustrated and described with respect to a wireless device that provides one or more APs using WLAN and PAN radio technologies, in other embodiments, the controller 500 can provide MAC privacy handling in other wireless devices, such as an STA. The MAC privacy handler 567 can perform the processes described herein with respect to the operations of the STA for receiving a request from a requester to provide a permanent MAC address and providing an encrypted MAC address to the requester.

In one embodiment, the controller 500 can be used in one or more wireless devices of a home wireless network or an automotive wireless network. In an automotive wireless network, an AP with this functionality can identify a car owner's wireless devices using this enhancement while allowing the wireless devices to run MAC address randomization for privacy. Once the car owner's one or more wireless devices are identified with the permanent MAC addresses, preferred QoS treatment can be applied to the car owner's wireless devices, for example. Alternatively, other differentiated services can be provided by one or more applications. An AP with this functionality can send an indication (e.g., "MAC Ind Required") to require an STA to send back their permanent MAC address for access control in a home wireless network. For example, the MAC address-based parent controls can be enforced and cannot be bypassed by enabling MAC address randomization. Alternatively, the functionality described herein can be used in other wireless environments for services that utilize a permanent MAC address while permitting MAC address randomization for privacy.

Figure 6:
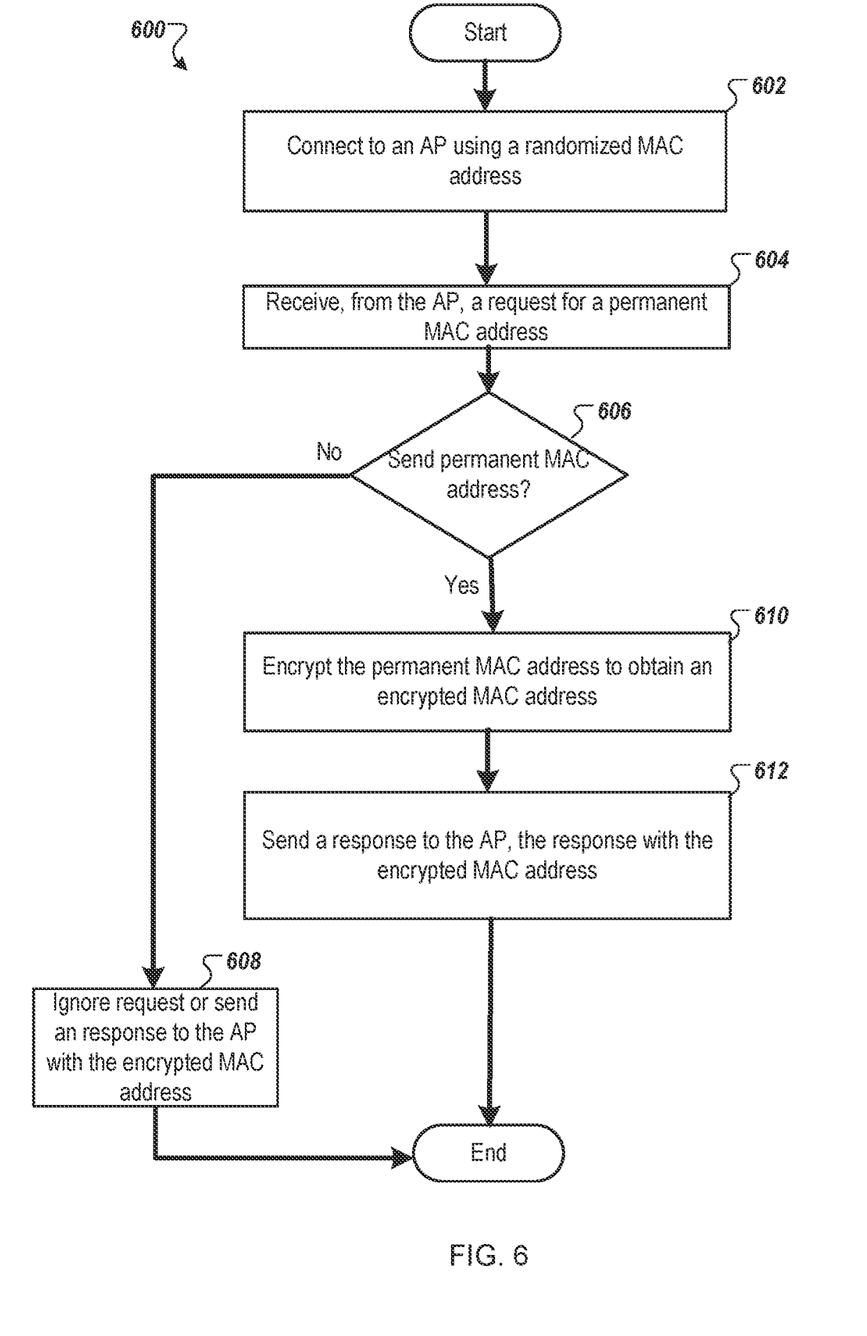
FIG. 6 is a flow diagram of a method of providing an encrypted MAC address according to at least one embodiment.

FIG. 6 is a flow diagram of a method 600 of providing an encrypted MAC address according to at least one embodiment. The method 600 may be performed by a processing logic that may include hardware (e.g., circuitry, dedicated logic, programmable logic, microcode, etc.), software (such as operations being performed by the MAC privacy handler 567), firmware, or a combination thereof. In at least one embodiment, the first wireless device 102 (STA) of FIG. 1 can perform method 600. In at least one embodiment, the MAC privacy handling logic 116 of FIG. 1 can perform method 600. In at least one embodiment, the first wireless device 202 of FIG. 3, the STA 302 of FIG. 3, or the controller 500 of FIG. 5 performs method 600. In other embodiments, other wireless devices as described herein perform the method 600.

Referring to FIG. 6, the processing logic begins the method 600 by connecting to an AP using a randomized MAC address (block 602). The processing logic receives a request for a permanent MAC address from the AP (block 604). The processing logic determines whether to send the permanent MAC address to the AP (block 606). In at least one embodiment, the processing logic checks a policy that specifies that the permanent MAC address is shareable with the AP. Alternatively, the processing logic can make this determination using other techniques. Responsive to the processing logic determining not to send the permanent MAC address at block 606, the processing logic ignores the request or sends a response to the AP without the permanent MAC address (block 608, and the method 600 ends. If the processing logic determines to send the permanent MAC address at block 606, the processing logic encrypts the permanent MAC address to obtain an encrypted MAC address (block 610). The processing logic sends a response with the encrypted MAC address (block 612), and the method 600 ends.

In a further embodiment, the request at block 604 is received in a beacon frame, a probe response, or a message of a multi-way handshake. In at least one embodiment, the request at block 604 is received prior to connecting to the AP at block 602. In this embodiment, the processing logic connects to the AP by responding to a beacon frame or sending a probe request. The AP can send a beacon frame with the request or a probe response with the request. When connecting to the AP, the processing logic sends the randomized MAC address at block 602.

In at least one embodiment, the processing logic receives the request and sends the response as part of a four-way handshake. In the four-way handshake, the processing logic receives, from the AP, a first message with a first nonce generated at the AP. The processing logic sends, to the AP, a second message with a second nonce generated at the wireless device (STA). The processing logic receives, from the AP, a third message with an encrypted session key and the request for the permanent MAC address. The processing logic encrypts the permanent MAC address using the session key to obtain the encrypted MAC address. The processing logic sends, to the AP, a fourth message with the encrypted MAC address. In a further embodiment, the third message and the fourth message are formatted in the KDE format. In a further embodiment, the second message also includes a first MIC, the third message also includes a second MIC, and the fourth message also includes a third MIC.

Figure 7:
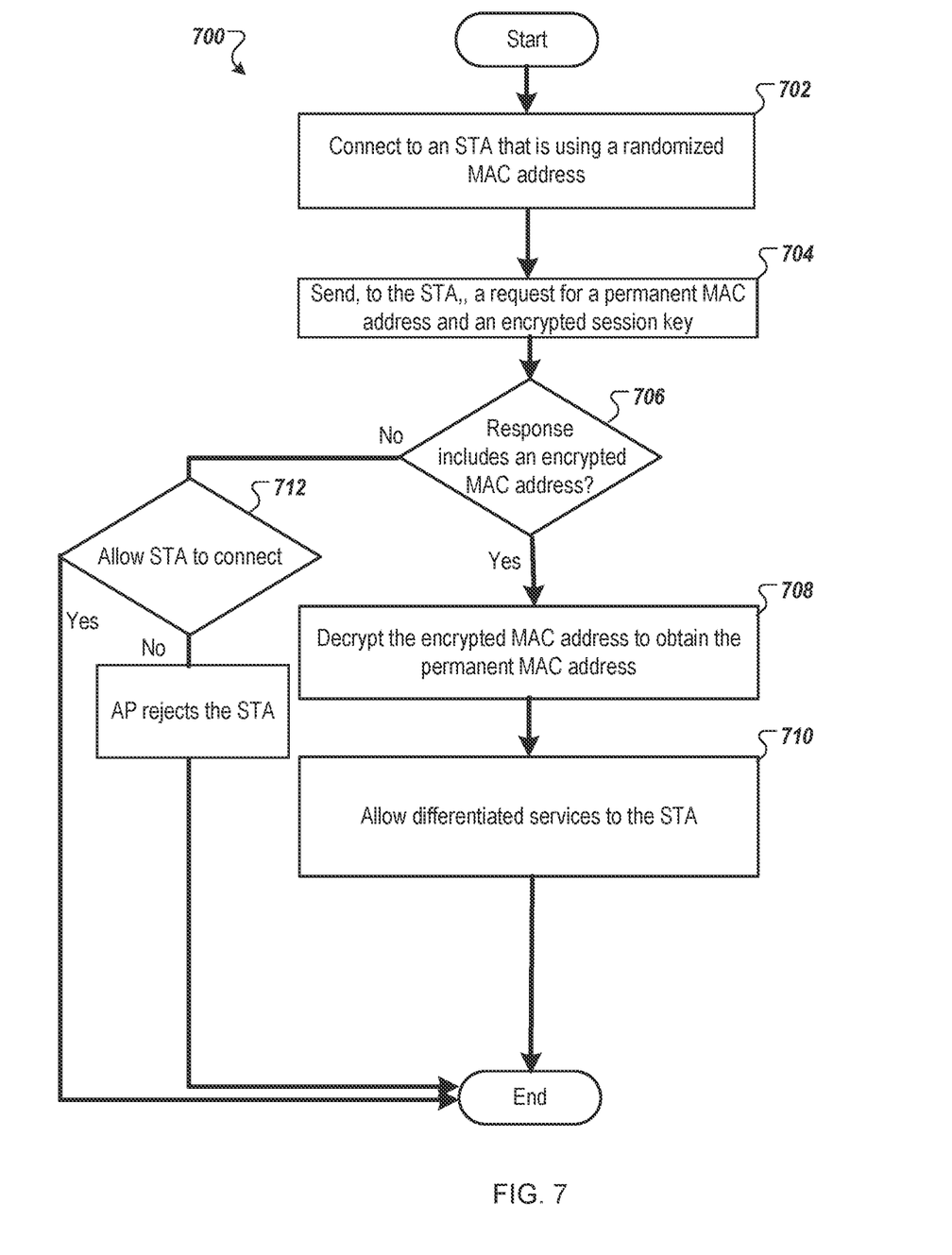
FIG. 7 is a flow diagram of a method of requesting a permanent MAC address according to at least one embodiment.

FIG. 7 is a flow diagram of a method 700 of requesting a permanent MAC address according to at least one embodiment. The method 700 may be performed by a processing logic that may include hardware (e.g., circuitry, dedicated logic, programmable logic, microcode, etc.), software (such as operations being performed by the MAC privacy handler 567), firmware, or a combination thereof. In at least one embodiment, the second wireless device 104 (AP) of FIG. 1 can perform method 700. In at least one embodiment, the MAC privacy handling logic 110 of FIG. 1 can perform method 700. In at least one embodiment, the second wireless device 204 of FIG. 3, the AP 304 of FIG. 3, or the controller 500 of FIG. 5 performs method 700. In other embodiments, other wireless devices as described herein perform the method 600.

Referring to FIG. 7, the processing logic begins the method 700 by connecting to an STA that is using a randomized MAC address (block 702). The processing logic sends a request for a permanent MAC address to the STA (block 704). The processing logic determines whether a response from the STA includes an encrypted MAC address (block 706). Responsive to the processing logic determining that the response does not include the encrypted MAC address, the processing logic further references its policy on whether to allow the STA to connect (block 712). If the policy allows the STA to connect at block 712, the process ends the method 700; otherwise, the AP rejects the STA (block 714), and ends the method 700. If the processing logic determines that the response includes the encrypted MAC address at block 706, the processing logic decrypts the encrypted MAC address using the session key to obtain the permanent MAC address (block 708). The processing logic allows differentiated services for the STA (block 710), and the method 700 ends.

In a further embodiment, the request at block 704 is sent in a beacon frame, a probe response, or a message of a multi-way handshake. In at least one embodiment, the request at block 704 is sent prior to connecting to the STA at block 702. In this embodiment, the processing logic connects to the STA by sending a beacon frame with the request or a probe response with the request in response to a probe request sent by the STA. When connecting to the STA, the processing logic receives the randomized MAC address at block 702.

In at least one embodiment, the processing logic sends the request and receives the response as part of a four-way handshake. In the four-way handshake, the processing logic sends a first message with a first nonce generated at the AP to the STA. The processing logic receives, from the STA, a second message with a second nonce generated at the STA. The processing logic sends, to the STA, a third message with an encrypted session key and the request for the permanent MAC address. The processing logic encrypts the permanent MAC address using the session key to obtain the encrypted MAC address. The processing logic receives, from the STA, a fourth message with the encrypted MAC address. In a further embodiment, the third message and the fourth message are formatted in the KDE format. In a further embodiment, the second message also includes a first MIC, the third message also includes a second MIC, and the fourth message also includes a third MIC.

In at least one embodiment at block 710, the processing logic changes a QoS parameter from a first value to a second value (e.g., indicating a higher priority) based on the permanent MAC address. For example, the AP can provide a higher level of QoS based on the permanent MAC address identifying a specified device. In at least one embodiment at block 710, the processing logic applies an access control policy to the first wireless device based on the permanent MAC address.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine-readable, computer accessible, or computer-readable medium, which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplary language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method of operating a wireless device, the method comprising:
   connecting to an access point (AP) using a first media access control (MAC) address, the first MAC address being a randomized MAC address;
   receiving, from the AP, a request for a permanent MAC address;
   determining whether to send the permanent MAC address;
   responsive to determining to send the permanent MAC address, encrypting the permanent MAC address to obtain an encrypted MAC address; and
   sending, to the AP, a response to the request, the response comprising the encrypted MAC address, wherein the receiving the request and sending the response comprises a four-way handshake comprising:
      receiving, from the AP, a first message, wherein the first message comprises a first nonce generated at the AP;
      sending, to the AP, a second message, wherein the second message comprises a second nonce generated at the wireless device;
      deriving a pairwise temporal key (PTK) using a pairwise master key (PMK), the first nonce, the second nonce, the first MAC address, and the permanent MAC address;
      receiving, from the AP, a third message, wherein the third message comprises an encrypted session key and the request for the permanent MAC address; and
      sending, to the AP, a fourth message, wherein the fourth message comprises the encrypted MAC address, wherein the encrypted MAC address is encrypted using at least a portion of the PTK.

2. The method of claim 1, wherein the receiving the request comprises receiving the request in at least one of a beacon frame, a probe response, or a message of a multi-way handshake between the wireless device and the AP.

3. The method of claim 1, wherein the receiving the request comprises receiving the request in a beacon frame or a probe response from the AP, wherein connecting to the AP comprises sending a first response to the beacon frame or the probe response, the first response comprising the first MAC address.

4. The method of claim 1, wherein the third message and the fourth message are formatted in a key data encapsulation (KDE) format.

5. The method of claim 1, wherein the second message further comprises a first message integrity code (MIC), wherein the third message comprises a second MIC, and wherein the fourth message comprises a third MIC.

6. The method of claim 1, wherein the determining whether to send the permanent MAC address comprises checking a policy that specifies that the permanent MAC address is shareable with the AP.

7. A wireless station (STA) comprising:
   a memory device to store a permanent media access control (MAC) address of the wireless STA; and
   a processing device coupled to the memory device, wherein the processing device is to:
      generate a randomized MAC address;
      connect to an access point (AP) using the randomized MAC address;
      receive, from the AP, a request for the permanent MAC address;
      determine whether to send the permanent MAC address;
      responsive to a determination to send the permanent MAC address, encrypt the permanent MAC address to obtain an encrypted MAC address; and
      send, to the AP, a response to the request, the response comprising the encrypted MAC address, wherein the request and the response are part of a four-way handshake in which the wireless STA is to:
         receive, from the AP, a first message, wherein the first message comprises a first nonce generated at the AP;
         send, to the AP, a second message, wherein the second message comprises a second nonce generated at the wireless station;
         derive a pairwise temporal key (PTK) using a pairwise master key (PMK), the first nonce, the second nonce, the first MAC address, and the permanent MAC address;
         receive, from the AP, a third message, wherein the third message comprises an encrypted session key and the request for the permanent MAC address; and
         send, to the AP, a fourth message, wherein the fourth message comprises the encrypted MAC address, wherein the encrypted MAC address is encrypted using at least a portion of the PTK.

8. The wireless STA of claim 7, wherein the request is included in at least one of a beacon frame, a probe response, or a message of a multi-way handshake between the wireless STA and the AP.

9. The wireless STA of claim 7, wherein the request is included in a beacon frame or a probe response from the AP, and wherein the processing device is to connect to the AP by sending a first response to the beacon frame or the probe response, the first response comprising the randomized MAC address.

10. The wireless STA of claim 7, wherein the third message and the fourth message are formatted in a key data encapsulation (KDE) format.

11. The wireless STA of claim 7, wherein the second message further comprises a first message integrity code (MIC), wherein the third message comprises a second MIC, and wherein the fourth message comprises a third MIC.

12. The wireless STA of claim 7, wherein the memory device is to further store a policy, and wherein the processing device is to determine whether to send the permanent MAC address by checking the policy that specifies that the permanent MAC address is shareable with the AP.

13. A wireless network of wireless devices comprising:
   a first wireless device; and
   a second wireless device, wherein the first wireless device and the second wireless device are connected using a first media access control (MAC) address, the first MAC being a randomized MAC address, and wherein:
      the second wireless device is to send to the first wireless device a first message comprising a first nonce generated at the second wireless device;
      the first wireless device is to send to the second wireless device a second message comprising a second nonce generated at the first wireless device;

the first wireless device is to derive a temporal key using at least the first nonce, the second nonce, the first MAC address, and the permanent MAC address;

the second wireless device is to send to the first wireless device a third message comprising an encrypted session key and a request for a permanent MAC address;

the first wireless device is to encrypt the permanent MAC address with at least a portion of the temporal key to obtain an encrypted MAC address; and the first wireless device is to send to the second wireless device a fourth message comprising the encrypted MAC address.

14. The wireless network of claim 13, wherein the third message and the fourth message are formatted in a key data encapsulation (KDE) format.

15. The wireless network of claim 13, wherein the second message further comprises a first message integrity code (MIC), wherein the third message comprises a second MIC, and wherein the fourth message comprises a third MIC.

16. The wireless network of claim 13, wherein the first wireless device is to store a policy, and wherein the first wireless device is to determine whether to send the permanent MAC address by checking the policy that specifies that the permanent MAC address is shareable with the second wireless device.

17. The wireless network of claim 13, wherein the second wireless device is to change a Quality of Service (QoS) parameter from a first value to a second value based on the permanent MAC address.

18. The wireless network of claim 13, wherein the second wireless device is to apply an access control policy to the first wireless device based on the permanent MAC address.

* * * * *